3,185,276
ELECTRO-MAGNETICALLY ACTUATED NOR-
MALLY DISENGAGED SPRING CLUTCHES
Frank M. Sajovec, Jr., Willowick, Ohio, assignor to
Curtiss-Wright Corporation, a corporation of Delaware
Filed Sept. 19, 1962, Ser. No. 224,683
3 Claims. (Cl. 192—84)

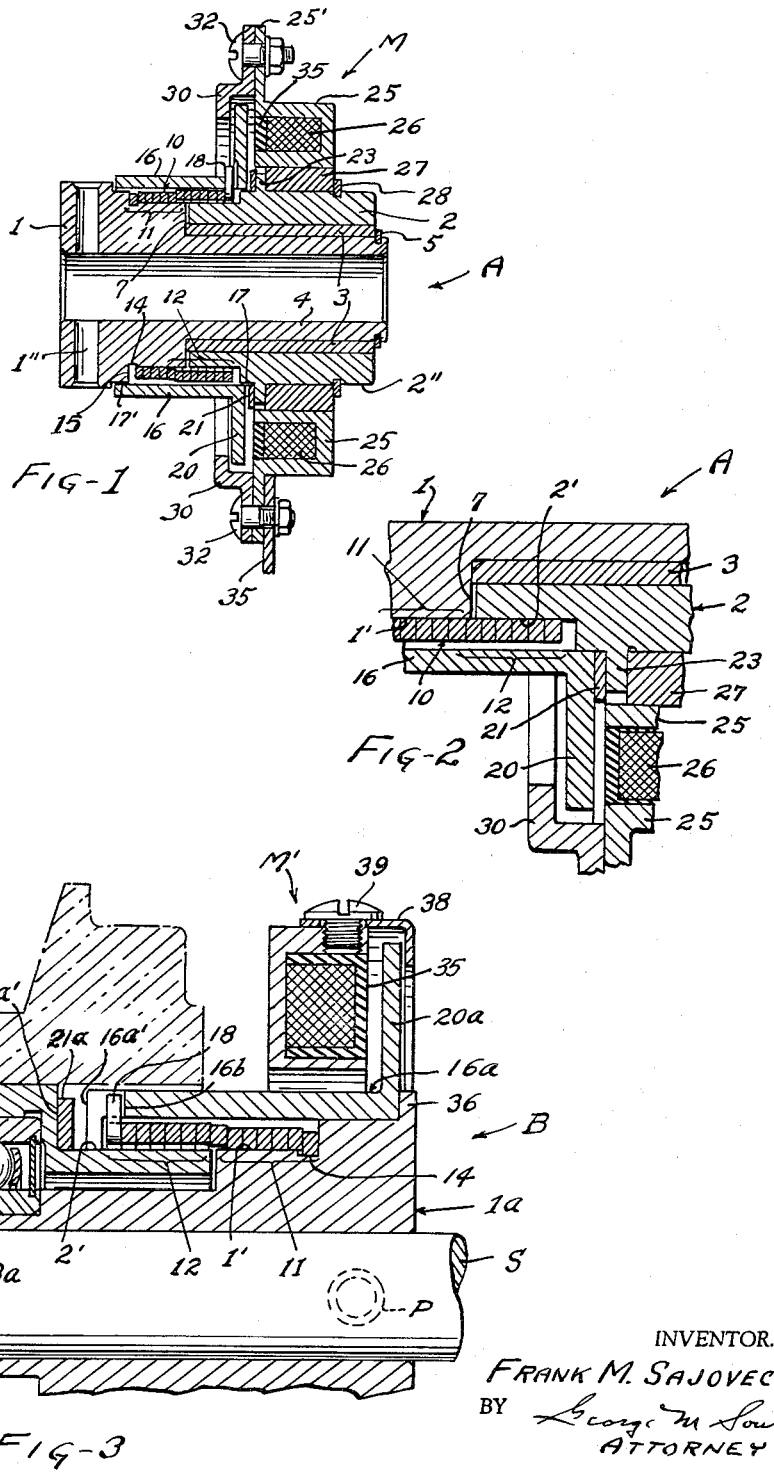

The present invention provides a relatively simple, effectual and compact spring or helical coil clutch of the above-title-indicated type, having, inter alia, negligible parasitic friction during idle periods (disengaged) and only momentary parasitic friction during engagement, and which can be easily manufactured and assembled at low cost, thus indicating the principal objects.

Other objects and features of the invention will become apparent from the following description of two illustrative forms. The essential characteristics are summarized in the claims.

In the accompanying drawing, FIG. 1 is a full scale central or axial sectional view through the present clutch mechanism in one form.

FIG. 2 is a double scale fragmentary sectional view principally illustrating the relationship of certain of the parts during engagement.

FIG. 3 is a fragmentary sectional double scale view similar to FIG. 1 (upper half) of a modified form of clutch in disengaged or idle condition.

As shown in FIG. 1 the electro-magnetically actuated, normally disengaged spring clutch mechanism A hereof comprises two coaxial clutch drum members 1 and 2 mounted for relative rotation in fixed position axially via a suitable bearing member 3 shown as a bushing between a reduced diameter tubular portion 4 of the drum member 1 pressed or otherwise secured in a central bore of the drum member 2 and detachbly held in place axially as by a snap ring 5 in a grooved portion of the member 1. That construction provides an adequately narrow cross-over gap 7 axially between relatively adjacent circular drum surfaces portions 1' and 2' respectively of the drum members 1 and 2. The drum surfaces as shown are, to advantage as will be explained, of equal diameter. The helical clutch spring 10 has a series of coils 11 preloaded or in interference fitting relationship with the drum surface 1' and a series of coils 12 normally (during disengagement) in radially spaced relationship to associated drum surface 1' and all of the drum surface 2'. The endmost coil of the group of coils 11 occupies an associated peripheral groove 14 in the drum member 1 snugly adjacent to an axial shoulder 15 on the member 1 so that the coils 11 of the clutch spring are secured against axial movement relative to the drum member 1. One or more of the coils 12 are normally in radially spaced relation to drum surface 1'.

To control the clutch spring 10 for torque-transmitting contraction on to both drum surfaces 1' and 2' at the cross-over region, particularly around the drum surface 2', a control member 16, shown in a form of sleeve supported for free rotation, as on circular surfaces 17 and 17' of respective drum member 2 and 1, is secured to turn in unison with the normally free coils 12 as via a tang or toe formation 18 on a free end coil of the spring 10 entering a suitable slot or hole in the control member 16. The control sleeve member 16 has an integral radial flange 20 which, during disengagement of the clutch, lies adjacent to but out of contact with a friction ring 21 of suitably hard friction material preferably loosely supported on and around the circular portion 17 of the drum member 2 adjacent a radial flange, rib or shoulder portion 23 thereof integral therewith.

In order to energize the clutch spring 10 and contract it as mentioned above, at least the flange portion 20 of the control sleeve 16 is of magnetizable material, and the sleeve is shifted on its circular supporting surfaces 17 and 17' from the position of the sleeve illustrated in FIG. 1 to its FIG. 2-illustrated position by a stationary electro-magnetic unit M having an annular trough-like integral double-pole-constituting annular portion 25 and a coil or coil assembly 26 of generally conventional form held in place as by a cementitious body 27' adapted to expand during solidification. The drum member 2 supports the magnetic pole portion or member 25 of unit M via a suitable bearing member 27 preferably pressed into the pole member 25 so as to be rigid therewith and held in place axially on the drum member 2 as between the rib 23 and a removable snap ring 28 in a groove around the drum member 2. A suitable, preferably non-magnetic guard member around the flange 20 of the control sleeve 16 is shown as an annulus 30 of so called Z-shaped cross-section secured to a flange portion 25' of the pole member 25 as by a series of screws 32 (two being shown). Two or more of the screws 32 are usually used to fasten the unit M to a suitable fixed part such as the frame or housing (not shown) of the mechanism to be served by the clutch. A portion of an attaching bracket 35 is shown as fastened by one of the screws 32 against the flange 25' for support of the magnet unit M on such machine. If the guard 30 is made of magnetic material it is advisable that it be disposed far enough away from the flange 20 of the control sleeve (farther than as shown) so that it will not become an important part of the magnetic circuit as through the radially outer part of the flange 20.

When the electro-magnet unit M is energized the flange portion 20 of the control sleeve 16 is forced axially against the friction ring 21 in order to contract the spring coils 12 into the gripping position on the drum surfaces 1' and 2' as shown in FIG. 2.

Either the drum member 1 or the drum member 2 can serve as input and either can be output for transmitting torque through the clutch A. If the drum member 1, as through use of a suitable cross pin in a hole 1'', FIG. 1, is attached to a driving or input shaft which is constantly rotated as by an electric motor and the member 2, as on its cylindrical rightwardly projected portion 2'' carries a drive wheel (not shown) connected to a load, the control sleeve 16, upon energization of the electro-magnetic unit M is arrested momentarily as the flange 20 is pressed against the friction ring 21, thereby contracting the coils 12 into gripping position as in FIG. 2. If the member 2 is the input then the electro-magnetic unit M, when energized, pulls the flange 20 of the control sleeve against the friction ring 21 on the rotating input member, thus producing sufficient friction force to contract the spring coils onto the drums for transmission of torque at designed value.

The construction according to FIG. 1 is entirely self-contained and self-supporting to maintain a predetermined air gap between the double pole portion 25 of the electro-magnet M and the armature portion of the control sleeve 16.

In the clutch unit B according to FIG. 3 the drum member 1a, having the coils 11 of the clutch spring 10 preloaded on it and axially secured as in a groove 14 as already described, is shown as though secured to a driving (or driven) shaft S as by a set screw P (partially shown). The bearing member 3 of FIG. 1 is replaced by a conventional sealed type ball bearing assembly 3a of adequate length axially for support of the drum member 2a and wheel W thereof on the shaft S. The friction ring 21a of suitably hard relatively high friction material is disposed against an axial shoulder 2a' of the drum member 2a (tight or loose) for engagement by a generally smooth and flat end surface 16a' of the control sleeve 16a lying at the end opposite from the armature or flange portion 20a of the control sleeve. The armature flange 20a as will be evident is operated by the electro-magnet unit M', constructed generally as already described in reference to unit M, but so as to shift the control sleeve 16a to the left for forcing the friction ring 21a against a shoulder 2a' of drum member 2a. Otherwise the construction and operation is essentially as already described in reference to FIGS. 1 and 2 and the same characters are used where appropriate to designate the parts.

The spring toe 18 FIG. 3 in the clutch construction or assembly B lies adjacent a shoulder 16b of the toe-receiving slot or hole in the sleeve 16a (same as in FIG. 1); and during energization of the electro-magnet M' the larger diameter coils 12 will be somewhat spread apart elastically as the friction surface 16a' engages the friction ring 21a. During subsequent disengagement of the clutch mechanism the deflected spring coils 12 will then return the sleeve 16a to the right as against a suitable positioning rib or shoulder 36 of the drum member 1a.

In the construction according to FIG. 3 a preferably non-magnetic sheet metal cover shell 38, held in place by a series of screws one of which is shown at 39, replaces the guard member 30; and the electro-magnet unit M' is usually secured to some fixed portion of the mechanism served by the clutch as by one or more brackets (not shown) occupying a position or positions between two or more of the screws 39 and the shell 38 so that the magnet always occupies the desired fixed position such as illustrated in FIG. 3.

In each of the clutch units A and B the normally free coils 12, mainly around the drum surface 12, are formed, as by conventional automatic coiling machines, in sufficiently radially stepped relationship to the coils 11 which are preloaded on the drum surface 1' so that the drum surfaces 1' and 2' can be substantially of equal diameters and thereby avoid twisting strains on the clutching coils as drum gripping thereby takes place. Also in each construction the normally free coils (e.g., group 12) serve to reposition the armature portion (flanges 20 and 20a), during clutch disengagement, in order to eliminate the possibility of the control sleeve (16 or 16a) then rubbing against the associated friction ring (21 or 21a). The normally free coils 12 are designed adequately to clear the interior of the control sleeve (16 or 16a) radially so that, during assembly of the associated mechanisms, the clutch spring is generally loose in the control sleeve.

I claim:

1. An electro-magnetically actuated normally disengaged spring clutch mechanism comprising two coaxial clutch drum members mounted for relative rotation in fixed position axially, a helical clutch spring operatingly secured to one of the drum members to rotate therewith and having a series of coils around a clutching surface of the other drum member but normally out of contact therewith, a control member rotatable about the axis of the drum members and shiftable along said axis relative to the drum members, said control member being torque-transmittingly secured to a terminal portion of said series of coils, a friction member axially between the control member and said other drum member and adapted to establish a torque-transmitting connection between that drum member and the control member as a function of axial shifting of the control member in one direction, a circular radial flange of magnetizable material on the control member, and a non-rotatable eletro-magnet unit having pole portions disposed axially adjacent and in spaced relation to the flange and operating via the flange to move the control member against the friction member to engage the clutch.

2. An electro-magnetically actuated spring clutch mechanism comprising two coaxial external clutch drum members having equal diameter cylindrical clutch drum surfaces mounted for relative rotation in fixed position axially, a helical clutch spring having a series of coils preloaded on one of the drum members to rotate therewith and having a series of normally larger diameter coils around the drum surface of the other drum member but normally out of contact therewith, a control member rotatable about the axis of the drum members and shiftable along said axis relative to the drum members, said control member being torque-transmittingly secured to a terminal portion of the second mentioned series of coils, a friction member axially between the control member and said other drum member and adapted to establish a torque-transmitting connection between that drum member and the control member as a function of axial shifting of the control member in one direction, a circular radial flange of magnetizable material on the control member, and a non-rotatable electro-magnet unit having pole portions disposed axially adjacent and in spaced relation to the flange and operating via the flange to move the control member against the friction member to engage the clutch.

3. The clutch mechanism according to claim 2 wherein an endmost one of said preloaded series of coils occupies a peripheral groove in the associated drum member to hold the spring against axial movement out of position.

References Cited by the Examiner

UNITED STATES PATENTS 2,534,033  12/50  La Brie.
2,976,976  3/61  Parker.

DAVID J. WILLIAMOWSKY, *Primary Examiner.*

FRANK SUSKO, *Examiner.*